United States Patent
Panhard

[15] 3,703,887
[45] Nov. 28, 1972

[54] IGNITION DEVICES FOR INTERNAL COMBUSTION ENGINES

[72] Inventor: Jean Panhard, Paris, France

[73] Assignee: Societe de Constructions Mecaniques Panhard & Levassor, Paris, France

[22] Filed: Dec. 10, 1969

[21] Appl. No.: 883,945

[30] Foreign Application Priority Data

Dec. 12, 1968 France..................68177919

[52] U.S. Cl........123/117 R, 123/146.5 A, 123/8.09, 123/148 C
[51] Int. Cl. ..........................F02p 5/04, F02p 5/08
[58] Field of Search..........123/117, 146.5, 8.05, 8.09, 123/8.11, 148 DS, 148 C, 117 R

[56] References Cited

UNITED STATES PATENTS

| | | | |
|---|---|---|---|
| 2,612,879 | 10/1952 | Hibbard | 123/8.09 |
| 3,196,846 | 7/1965 | O. H. Lendorf | 123/8.09 |
| 2,712,814 | 7/1955 | Harr | 123/117 |
| 3,220,395 | 11/1965 | Julian et al | 123/146.5 |
| 3,320,770 | 5/1967 | Bevacqua | 123/117 |
| 3,482,559 | 12/1969 | Salomon | 123/117 |
| 3,584,608 | 6/1971 | Shibagaki | 123/8.09 |
| 3,221,725 | 12/1965 | Julian et al | 123/146.5 R |

Primary Examiner—Laurence M. Goodridge
Assistant Examiner—Cort Flint
Attorney—Waters, Roditi, Schwartz & Nissen

[57] ABSTRACT

The ignition device, especially for rotary piston engines, includes means sensitive only to the rotary speed of the engine and modifying means such as a centripetal mechanism or an electromechanical mechanism. This modifying means ensures, on one hand, a substantially constant value of the ignition advance on starting and on slow-running speed of the engine, up to a speed $N_L$ r.p.m., on the other hand a rapid reduction in the advance for rotary speeds of the engine comprised between $N_L$ and the speed $N_S$, $N_S$ being greater or equal to $N_L$ and, finally on the other hand, an increase of the advance when the rotary speed exceeds $N_S$.

1 Claim, 3 Drawing Figures

IGNITION DEVICES FOR INTERNAL COMBUSTION ENGINES

The invention relates to ignition devices of the type of those for internal combustion engines in which the combustion chamber is periodically placed in communication with the induction pipe before being isolated from the exhaust pipe, and it relates preferably, because it is in this case that its application appear to offer the greatest advantage, but not exclusively, among these ignition devices, those for rotary piston motors.

It is known, that in rotary piston motors, the combustion chamber is regularly placed in communication simultaneously with the exhaust port and the intake port or a fraction of a cycle, by reason of the geometry of the casing and of the piston. It is also known that, in conventional internal combustion engines, an overlap can be produced (that is to say a simultaneous opening) of the intake and exhaust valves, especially for high speed engines. In the engines considered, when the butterfly valve of the gases is practically closed, and especially at low speeds of rotation comprised in a critical zone, a considerable suction is created downstream of the said butterfly valve, in the course of the intake, by the movement of the piston, which suction favors, on placing the exhaust and the intake in communication, a transfer of a considerable portion of the burnt gases towards the intake and their aspiration with fresh gases. There results therefrom imperfect mixtures whose ignition is uncertain, which causes irregular operation or by jerks of the engines under consideration.

CUstomary ignition devices include a correction of advance as a function of the speed of the engine by usually a centrifuge device conjointly or not with a suction correction of the advance.

The invention has for an object, particularly, to render ignition devices of the type in question such that they respond better than up to the present to the various requirements of practice and particularly that they enable suppression or at least considerable reduction of the irregular operation or by jerks of the engines in the critical speed zone.

According to the invention, an ignition device of the type in question is characterized in that it comprises means sensitive only to speed of rotation of the engine and adapted to ensure, on one hand, a substantially constant value of the ignition advance on the starting and on the idling operation of the engine, that is to say when the speed of the latter remains comprised between null and a limit $N_L$, on the other hand, a rapid reduction of the advance for the engine speeds comprised between speed $N_L$ and a speed $N_S$ greater than or equal to $N_L$ and, on the other hand finally, a progressive increase of the advance proportionately as the rotary speed increases beyond $N_S$.

The invention consists, apart from this principal arrangement, in certain other arrangements which are preferably used at the same time and which will be more explicitly discussed below.

In order that the invention may be more fully understood, several preferred embodiments of the ignition device according to the invention are described below, purely by way of illustrative non-limiting examples, with reference to the accompanying drawings, in which.

According to the invention, an ignition device or an internal combustion engine with a rotary piston is constructed as follows.

As regards the ignition device as a whole, and excluding means adapted to regulate the ignition advance, this is constituted in conventional manner. There is provided especially a contact-breaker 19 (FIG. 2) which, by co-operating with a cam 2 with two diametrically opposite bosses driven at a speed proportional to that of a shaft 3 driven by the engine, enables the periodic interruption of the primary circuit of an induction coil (not shown).

Figure 3:
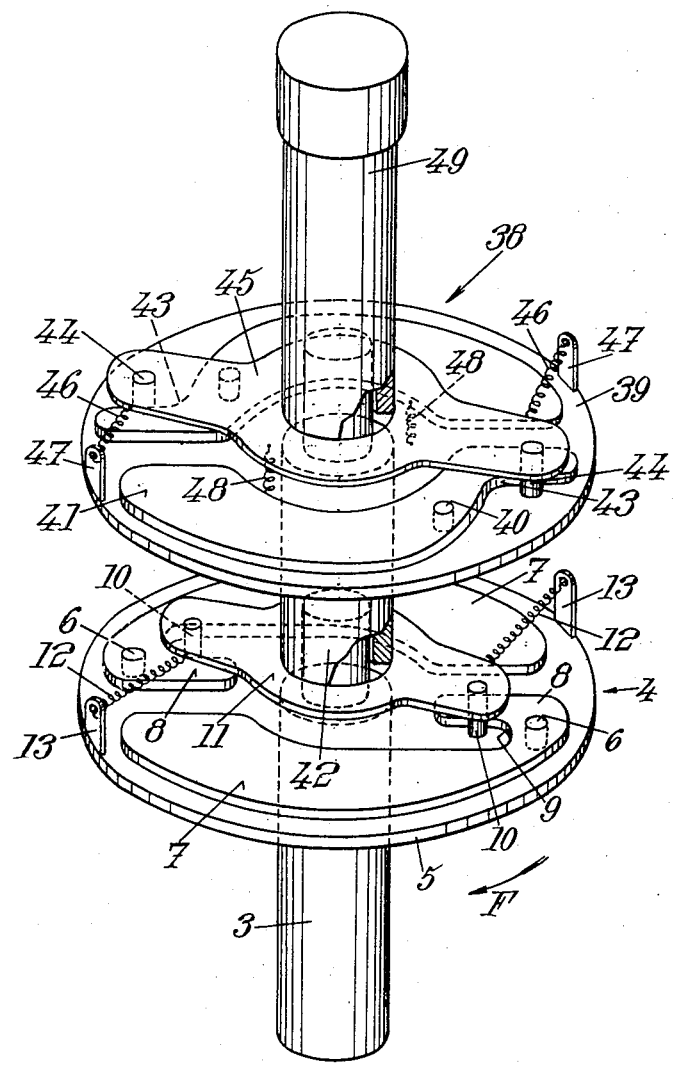
FIG. 3 shows, in perspective, a second embodiment of means sensitive only to the rotary speed of the engine.

As regards means adapted to regulate the ignition advance, there is provided for example a centrifugal assembly 4, which as shown in FIG. 3, can be composed essentially of a flat disc 5 whose center is situated on the axis of the shaft 3 and whose plane is perpendicular to this axis. This disc 5 is rigidly fixed to the shaft 3 and bears two diametrically opposite pivot pins 6 perpendicular to its plane. On these pivot pins are respectively hinged, in the vicinity of one of their ends, two flat weights 7, of a generally crescent shape and symmetrical with respect to the center of the disc 5. The weight of the said masses is concentrated towards the ends remote from the pins 6. The ends 8 of the masses, situated in the vicinity of the pins 6, are curved towards the center of the disc 5 so as to form concave parts 9 in the hollow of which are borne the catchpins 10, diametrically opposite and carried by a flat part 11, parallel to the plane of the disc 5, of elongated shape and symmetrical with respect to the axis of the shaft 3.

The part 11 is mounted free to rotate on the shaft 3 but the catchpins 10 are held supported against the concave portions 9 by means of two diametrically opposite return springs 12, connecting the part 11 to two diametrically opposite lugs 13, borne by the disc 5. The cam 2 (FIG. 3) acting on the breaker 19 is connected to the part 11 and is usually rigidly fixed to rotate with the said part.

Of course the device described to this point is conventional and it operates as follows.

When the engine is started, the shaft 3 turns, in the direction of the arrow F (FIG. 3) for example. Under the effect of centrifugal force, the masses 7 have a tendency to turn around the pins 6 and their ends, spaced from pins 6, have a tendency to separate from the axis of the shaft 3. As long as the speed of the engine, and consequently of the shaft 3, is unsufficient for the centrifugal force to overcome the resistance of the springs 12, the masses 7 are not displaced with respect to the disc 5 and it is the same with the part 11, driven by fingers 10 in abutment against the portions 9 of the masses 7, and of the cam 2 whose angular setting with respect to the shaft 3 remains constant. When the speed increases and exceeds a certain threshold, the centrifugal effect becomes greater than that of the springs 12 and the part 11 turns with respect to the disc 5 and to the shaft 3 in the direction of the arrow F. When the speed decreases, the part 11 turns in reverse direction. In making an increase in the ignition advance, correspond with a rotation in the direction F of the part 11, there is obtained a regularly increasing advance as a function of the rotary speed of the engine, which, generally, is advantageous and enables, at any speed, the thermal yield of the engine to be kept high.

However, it is observed that with such a control of the ignition advance, the internal combustion engines in which communication is periodically established between the inlet pipes and the exhaust through the combustion chamber, operate irregularly or by "jerks" when they rotate at low speed, or when they are decelerating, that is to say when the butterfly valve for the gases is practically closed, as explained previously.

Figure 1:
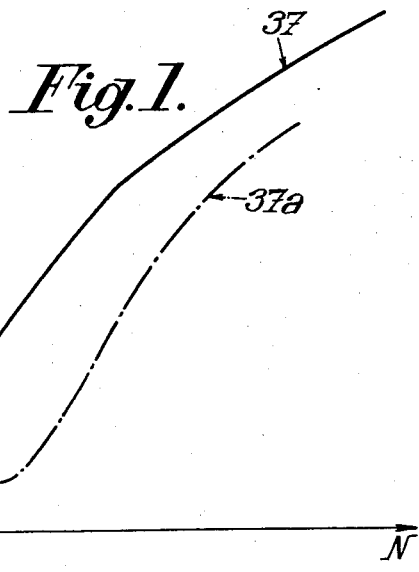
FIG. 1 shows the variations in the ignition advance, produced by an ignition device constructed according to the invention, as a function of the speed of rotation N of the engine.

To overcome this drawback and according to the main feature of the invention, ignition devices of the type concerned, are made to include means sensitive to the rotary speed of the motor and adapted to ensure, on one hand, a substantially constant value of the ignition advance on the starting and the operation of the motor at slow speed, that is to say when the speed of the latter comprises between zero speed and a limit $N_L$, on the other hand, a rapid reduction of the advance or rotary speeds of the engine comprised between the speed $N_L$ (FIG. 1) and a speed $N_S$ greater or equal to $N_L$ and, finally on the other hand, a progressive increase in the advance in proportion as the rotary speed increases beyond the value $N_S$ (FIG. 1).

$N_L$ expressed in turns of the engine shaft per minute is of the order of 600 to 1,000 r.p.m., while $N_S$ is of the order of 1,000 to 1,200 r.p.m.

In a first embodiment (FIG. 2), there is provided, in addition to the conventional centrifugal assembly 4 shown diagrammatically by a rectangle, electro-mechanical means 16 which comprise a centrifugal element 50 rotated by the shaft 3 and acting on a electrical switching device 18 so as to bring into circuit, for rotary speeds less than $N_L$, a breaker 1 and, for rotary speeds greater than $N_S$ which, in this embodiment is equal to $N_L$, a second breaker 19 displaced angularly with respect to the first by a certain angle A. The springs 12 of the assembly 4 are then calibrated in such manner that they only intervene for rotary speeds greater than $N_S$. Thus, when the position of the cam 2 is affected by the centrifugal assembly 4, it is the second breaker 19 which is in circuit.

In the embodiment shown, the electro-mechanical means 16 comprises a circular plate 20 provided with two diametrically opposite arms 21 and 22 perpendicular to the plane of the plate. A cylindrical sleeve 23, of axis normal to the plane of the plate 20 and passing through its center, is mounted on the shaft 3 coaxially with the said shaft. The arms 21 and 22 and the sleeve 23 extend from each side of the plate 20, the latter being connected rigidly by the said sleeve 23 to the shaft 3. The centrifugal element 50 is constituted by a mass 17 external to the plate 20 and suspended on a rod 24 parallel with the axis of the shaft 3 and hinged at the free end of the arm 21 so as to be able to oscillate in a plane passing through the axis of the said shaft 3. This rod 24 is curved towards the plate 20, along the arm 21, on the side opposite to the mass 17, then extends radially to the axis of rotation of the whole. The rod bears, at one end, a contact of insulating material 25, whose base is located on the rod and whose tip, occurs on the axis of rotation of the assembly. Consequently the tip of the contact 25 is not driven in the general rotary motion. This tip of the contact 25 bears on the middle of a strip element 26 which is not rotated by the shaft 3. This strip is mounted at one of its ends on an axle 27 at right angles to the axis of the shaft 3 and bears, at its other end, a conductive pastille or small plate 28 adapted to contact one or other of two conductive plates 29 and 30.

A first spring 31 is connected, on one hand, to the mass 17, and, on the other hand, to the arm 22 through a rod 32. This spring 31, arranged along a diameter of the plate 20, passes through a hole 23a in the sleeve 23. A second spring 33 is provided to restore the strip 26 towards the plate 30. The strips of breakers 1 and 19 are respectively connected electrically to the plates 29 and 30. The plate 28 of the strip 26 is connected electrically to a terminal of the primary winding of an induction coil (not shown), the other terminal of the coil being connected to the positive terminal of a D.C. source, a battery for example.

Such being the case, the operation of the assembly is as follows.

When the engine rotates at a speed lower than $N_L$, $N_L$ expressed in r.p.m. of the engine shaft being of the order of 600 to 1,000 r.p.m., and especially when the engine is turning slowly, the restoring force of the spring 31 on the mass 17 is greater than the centrifugal effect. The said mass is brought back towards the axis of the shaft 3 and the contact 25 urges the plate 28 against the plate 29. It is then the breaker 1 which is in circuit. Its position is such that the angular advance is $A_1$, $A_1$ expressed in degrees of arc being comprised, in general, between 10° and 25° (FIG. 1). The cam 2 (FIG. 2) is assumed to rotate in anti-clockwise direction. As long as the rotary speed is less than $N_L$, the centrifugal assembly 4 does not come into play and the advance remains substantially constant. In FIG. 1, where the rotary speeds N of the engine are borne as abscissae and the advances as ordinates expressed for example in degrees of arc, the point representing the advance describes a segment of a line 34–35 parallel to the axis of the abscissae.

Figure 2:
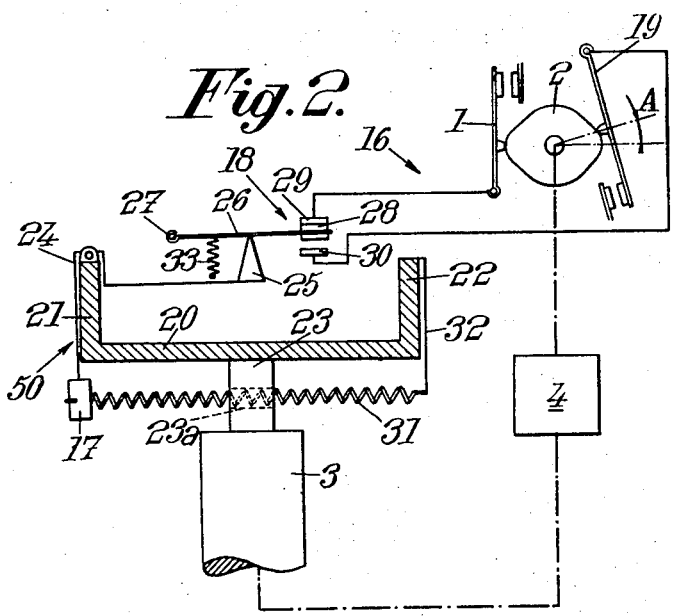
FIG. 2 shows diagrammatically a first embodiment of means sensitive only to the rotary speed of the engine, forming part of any ignition device constructed according to the invention and enabling the relationship in FIG. 1 to be achieved.

When the speed $N_L$ is reached, the centrifugal force which is exerted on the mass 17 becomes greater than the restoring force of the spring 31 and, due to a rapid tilting device, not shown in the diagrammatic view of FIG. 2, the mass 17 separates suddenly from the axis of the shaft 3, which separates the contact 25 abruptly from the strip 26 and enables the plate 28 to be applied against the plate 30, the strip 26 being brought back by the spring 33. Through this fact, the breaker 1 is put out of circuit and it is the breaker 19 which comes into operation. Thus, the ignition advance is suddenly reduced by an angle A corresponding to the angular displacement of the two breakers 1 and 19, and on the curve of FIG. 1, one passes from the point 35 to the point 36. The angle A may be sufficient to change from an ignition retard. The angle A can reach values of the order of 40 degrees of arc.

Then, for rotary speeds greater than $N_L$, the centrifugal assembly 4 comes into action to cause the advance to increase progressively when the rotary speed increases. The portion of the curve 37 (FIG. 1) is then followed.

There is hence obtained an ignition advance relationship as a function of the rotary speed shown (FIG. 1) by a substantially V-shaped curve.

In a second embodiment (FIG. 3), there is provided, in addition to the conventional centrifugal assembly 4, a centripetal assembly 38 rotated by the part 11 of the centrifugal assembly 4, which centripetal assembly 38 is adapted to cause the ignition advance to diminish in proportion as the speed increases for rotary speeds comprised between $N_L$ and $N_S$.

The assembly 38 is substantially composed of the same elements as the assembly 4, namely, a disc 39 bearing diametrically opposite pivots 40 on which are hinged masses 41 of crescent shape. The disc 39 is keyed on an intermediary shaft 42 aligned with the shaft 3 and rigidly fixed to the part 11. The disc 39 and the said part 11 are hence connected in rotation. The ends of the masses 41 adjoining the pivots 40 are curved, not towards the center as was the case for the assembly 4, but towards the periphery of the disc 39 so as to form concave portions 43 situated on the outer perimeter of the masses, as shown in FIG. 3. Diametrically opposite, catchpins 44, borne by a flat part 45, analogous to the part 11, of elongated form and mounted to rotate freely on the shaft 42, co-operate with the portions 43 or with the immediate vicinity of the outer contour of the masses 41. The part 45 is connected by two springs 46, symmetrical with respect to the axis of the shaft 42, with two lugs 47 borne by the disc 39 so that the pins 44 are brought back against the portions 43. Two springs 48 each connected, on one hand, to a mass 41, and, on the other hand, to a point in the vicinity of the center of the disc 39, tend to restore towards the said center the ends of the masses separated from the pivots 40. The part 45 is rigidly fixed to a shaft 49, coaxial with the shafts 3 and 42, which shaft 49 is connected to rotate with the cam 2 (not shown in FIG. 3).

The operation of this second embodiment is as follows.

As long as the rotary speed remains below $N_L$, $N_L$ being of the order of magnitude given previously, the masses 7 of the assembly 4 and the masses 41 of the assembly 38 are respectively held by the springs 12 and 48 in fixed position with respect to their respective discs 5 and 39. The angle of the ignition advance remains therefore substantially constant.

When the speed $N_L$ is reached, the calibration of the springs 48 (and possibly 46) is such that the masses 41 begin to be displaced under the action of the centrifugal force while the masses 7 are not yet displaced by reason of the higher calibration of the springs 12. The ends of the masses 41 distant from the pivots 40 separate from the axis of the shaft 49. The displacement of the masses 41, by separating the concave portions 43 from the pins 44, will cause rotation of the part 45, brought back by springs 46, and hence of the shaft 49, with respect to the disc 39, in reverse direction to that of the arrow F, which indicates the direction of rotation of the shaft 3. With this angular displacement of the part 45 and of the shaft 49 with respect to the shaft 3, whose initial angular separation with respect to the plate 39 is preserved, will correspond a reduction of the ignition advance. This reduction in the advance is followed up to a value $N_S$ of the rotary speed for which the masses 41 are applied against stops (not shown), the value $N_S$ being possibly, this time, greater than $N_L$. In general $N_S$ expressed in the number of turns of the shaft of the engine per minute, is of the order of 1,000 to 1,200 r.p.m.

In addition, the calibration of the springs 12 of the assembly 4 is such that the said assembly comes into play as described previously, when the speed reaches the value $N_S$, to progressively displace, with respect to the disc 5, the shaft 42 and with it the plate 39, the masses 41 in abutment, the pins 44, the part 45, the shaft 49 and the cam 2 in the direction of an increase in the advance as a function of the rotary speed (displacement in the direction of the arrow F).

There is thus obtained a relationship of the ignition advance as a function of the rotary speed quite analogous to that obtained due to the first embodiment (FIG. 1), with the sole difference that, in the case of the second embodiment, $N_S$ can be greater than $N_L$ and that the relationship of the advance obtained is shown by a curve in mixed line 37a.

The centrifugal element 50 (FIG. 2) or centripetal assembly 38 (FIG. 3) can be replaced by an electronic threshold triggering means, known in itself, estimating the engine speed by counting pulses sent off by the spark and acting on an electro-mechanical relay.

In the case where there would be two spark plugs with or without angular separation of the ignition times the systems described would be duplicated (one per spark plug).

Whatever the embodiment adopted, an ignition device is obtained giving a relationship of ignition advance as a function of the rotary speed, which enables considerable reduction in the irregularities of operation at low speed of internal combustion engines in which the combustion chamber is periodically placed in communication with the induction pipe before being isolated from the exhaust pipe and, especially, rotary piston engines.

As is self-evident, and as is already clear from the preceding description, the invention is in no way limited to those embodiments, nor to those methods of production of its various parts, which have been more particularly described; it embraces, on the contrary, all variations.

What I claim is:

1. An ignition device for an internal combustion engine in which the combustion chamber is periodically placed in communication with the induction pipe before being isolated from the exhaust pipe, said device comprising means sensitive only to the rotary speed of the engine adapted to act when the engine speed exceeds a lower limit $N_S$, and modifying means adapted to ensure, on one hand, a substantially constant value of the ignition advance on starting and on slow-running speed of the engine, up to a speed $N_L$ r.p.m., on the other hand a rapid reduction in the advance for rotary speeds of the engine comprised between $N_L$ and the speed $N_S$, $N_S$ being greater or equal to $N_L$ and, finally on the other hand, an increase of the advance when the rotary speed exceeds $N_S$, and wherein the modifying means are electro-mechanical means and comprise a centrifugal element rotated by the engine and acting on an electrical switching device so as to place in circuit, for rotary speeds less than $N_L$, a first breaker and, for speeds greater than $N_L$ which is equal to $N_S$, a second breaker angularly displaced from the first by a predetermined angle, a conventional centrifugal assembly being provided to ensure an increasing advance as a function of the rotary speed when the latter is greater than $N_L$ and the second breaker is in circuit.

* * * * *